US012198518B2

(12) United States Patent
Bodas et al.

(10) Patent No.: US 12,198,518 B2
(45) Date of Patent: Jan. 14, 2025

(54) PACKAGE PROTECTION USING EXISTING SECURITY SYSTEM

(71) Applicant: Cloud Software LLC, Federal Way, WA (US)

(72) Inventors: Devadatta Bodas, Federal Way, WA (US); Kanchan Bodas, Federal Way, WA (US); Rajiv Nashikkar, Pune (IN); Tanmay Dharmadhikari, Alpharetta, GA (US)

(73) Assignee: Cloud Software, LLC, Federal Way, WA (US)

( * ) Notice: Subject to any disclaimer, the term of this patent is extended or adjusted under 35 U.S.C. 154(b) by 0 days.

(21) Appl. No.: 18/241,952

(22) Filed: Sep. 4, 2023

(65) Prior Publication Data
US 2024/0127682 A1    Apr. 18, 2024

Related U.S. Application Data

(63) Continuation of application No. 17/568,575, filed on Jan. 4, 2022, now Pat. No. 11,776,371, which is a continuation of application No. 17/093,158, filed on Nov. 9, 2020, now Pat. No. 11,257,338.

(51) Int. Cl.
G08B 13/14       (2006.01)
G06Q 10/0832     (2023.01)
G06Q 10/0833     (2023.01)
G08B 13/24       (2006.01)
G08B 25/10       (2006.01)

(52) U.S. Cl.
CPC ..... *G08B 13/2482* (2013.01); *G06Q 10/0832* (2013.01); *G06Q 10/0833* (2013.01); *G08B 13/248* (2013.01); *G08B 25/10* (2013.01)

(58) Field of Classification Search
CPC .. G08B 13/2482; G08B 13/248; G08B 25/10; G08B 13/1436; G08B 21/0269; G08B 21/0272; G08B 21/023; G08B 5/36; G08B 13/1427; G08B 21/028; G08B 21/0227; G06Q 10/0832; G06Q 10/0833
USPC ...................................... 340/572.1
See application file for complete search history.

(56) References Cited

U.S. PATENT DOCUMENTS

2004/0054607 A1* 3/2004 Waddington ........... G06Q 10/08
                                                         705/28
2016/0171438 A1* 6/2016 Ladden ................. G06F 3/0484
                                                         715/741

(Continued)

*Primary Examiner* — Tai T Nguyen

(57) ABSTRACT

A computer-implemented method includes receiving, by a base station of a security system, an identification of a shipment package, the identification received from a first security sensor that is part of the security system. The method further includes adding, by the base station, a shipment device of the shipment package as a second security sensor of the security system. The method further includes configuring, by the base station, the shipment device in protect-mode, wherein the shipment device sounds an alarm in response to the shipment being displaced by at least a predetermined distance when in the protect-mode. The method further includes reconfiguring, by the base station, the shipment device in safe-mode in response to receiving, from a customer associated with the shipment package, a confirmation signal that the shipment package has been safely received.

20 Claims, 10 Drawing Sheets

(56) References Cited

U.S. PATENT DOCUMENTS

2017/0032382 A1\* 2/2017 Shulman ............ G06K 7/10861
2020/0051015 A1\* 2/2020 Davis ..................... G06Q 10/08

\* cited by examiner

PACKAGE PROTECTION USING EXISTING SECURITY SYSTEM

CROSS-REFERENCE TO RELATED APPLICATION

The present application is a continuation application of U.S. patent application Ser. No. 17/568,575, filed on Jan. 4, 2022, and which is now issued as U.S. Pat. No. 11,776,371 which is a continuation application of U.S. patent application Ser. No. 17/093,158 filed on Nov. 9, 2020, and which is now issued as U.S. Pat. No. 11,257,338 the contents of which are incorporated by reference herein in entirety.

BACKGROUND

The present invention generally relates to electronic circuits and computing technology that facilitates protection of a shipment package.

E-commerce and home deliveries of goods and services have now become ubiquitous. Consumers today order goods online, i.e., via the Internet, rather than purchasing such goods at brick and mortar stores. Further, food deliveries from restaurants, as well as grocery delivery from grocery stores have also increased. Consumers have welcomed the added convenience of receiving shipment packages at their doorstep as well as shipping packages from their doorstep, rather than dropping such shipment packages at a storefront. There is an increased frequency of theft of such shipment packages. With delivery personnel making multiple rounds, shipping companies also see value in providing such services.

SUMMARY

A system to ensure that a shipment package is received by the correct recipient is described. The system includes a shipment device that includes several sensors, the shipment device being physically coupled with the shipment package. A shipment server associates the shipment device with the shipment package and monitors and controls operation modes of the shipment device. The shipment device can sound an alarm and notify the shipment server and one or more users in case the shipment device is displaced from a delivery location.

A method, a computer program product, and several components that are part of the system are also described herein.

According to one or more aspects, a computer-implemented method includes receiving, by a base station of a security system, an identification of a shipment package, the identification received from a first security sensor that is part of the security system. The method further includes adding, by the base station, a shipment device of the shipment package as a second security sensor of the security system. The method further includes configuring, by the base station, the shipment device in protect-mode, wherein the shipment device sounds an alarm in response to the shipment being displaced by at least a predetermined distance when in the protect-mode. The method further includes reconfiguring, by the base station, the shipment device in safe-mode in response to receiving, from a customer associated with the shipment package, a confirmation signal that the shipment package has been safely received.

In an example, in the protect-mode, in response to the shipment package being displaced by at least a predetermined distance, causing an alarm via the base station.

In an example, wherein the first security sensor comprises a camera, and the identification of the shipment package is received by scanning a code of the shipment package via the camera.

In an example, the identification of the shipment package is received by entering a code of the shipment package via the first security sensor.

The method further includes, in response to receiving the identification of the shipment package, verifying, by the base station, that the identification is associated with an address at which the base station is located.

The method further includes, in response to receiving the identification of the shipment package, verifying, by the base station, that the identification is associated with at least one predetermined identification from a list of expected shipment packages.

The method further includes, receiving, by the base station, information about an expected shipment package from a shipment server.

The method further includes, receiving, by the base station, information about an expected shipment package from a client device.

According to one or more aspects, a computer-implemented method includes receiving, by a base station of a security system, an identification of a shipment package. The method further includes, adding, by the base station, a shipment device of the shipment package as a security sensor of the security system. The method further includes, configuring, by the base station, the shipment device in protect-mode, wherein the shipment device sounds an alarm in response to the shipment being displaced by at least a predetermined distance when in the protect-mode. The method further includes, reconfiguring, by the base station, the shipment device in safe-mode in response to authenticating a user associated with a pickup of the shipment package. The method further includes, removing, by the base station, the shipment device from the security system.

In an example, in the protect-mode, in response to the shipment package being displaced by at least a predetermined distance, causing an alarm via the base station.

In an example, the first security sensor comprises a camera, and the identification of the shipment package is received by scanning a code of the shipment package via the camera.

In an example, the identification of the shipment package is received by entering a code of the shipment package via the first security sensor.

In an example, the identification of the shipment package is received from a client device.

In an example, authenticating the user comprises receiving, from an authorized device associated with the pickup of the shipment package, a confirmation signal that the shipment package has been safely picked up.

In an example, authenticating the user comprises receiving, by the base station, information about the authorized user from a shipment server.

According to other aspects, a security system includes one or more sensors, and a base station. The base station includes memory and one or more processors. The base station is configured to perform one or more methods described herein.

According to other aspects, a computer program product includes a memory device with computer executable instructions stored thereon. The computer executable instructions when executed by one or more processors cause the processors to execute one or more methods described herein.

According to other aspects, a shipment device includes one or more sensors and one or more processors, wherein the one or more processors are configured to perform one or more operations that are part of the methods described herein.

Other objects and advantages of the present invention will become apparent to those of skill in the art upon contemplation of the disclosure herein in conjunction with the drawings as described below.

DETAILED DESCRIPTION

Embodiments of the present invention address technical challenges with online commerce, particularly, with receiving an order from a customer for purchase of an item and fulfilling the order by shipping the item to a shipment-address. Fulfilling the order includes shipping the item to the shipment-address and ensuring that an intended person received a shipment that contains the item.

Figure 1:
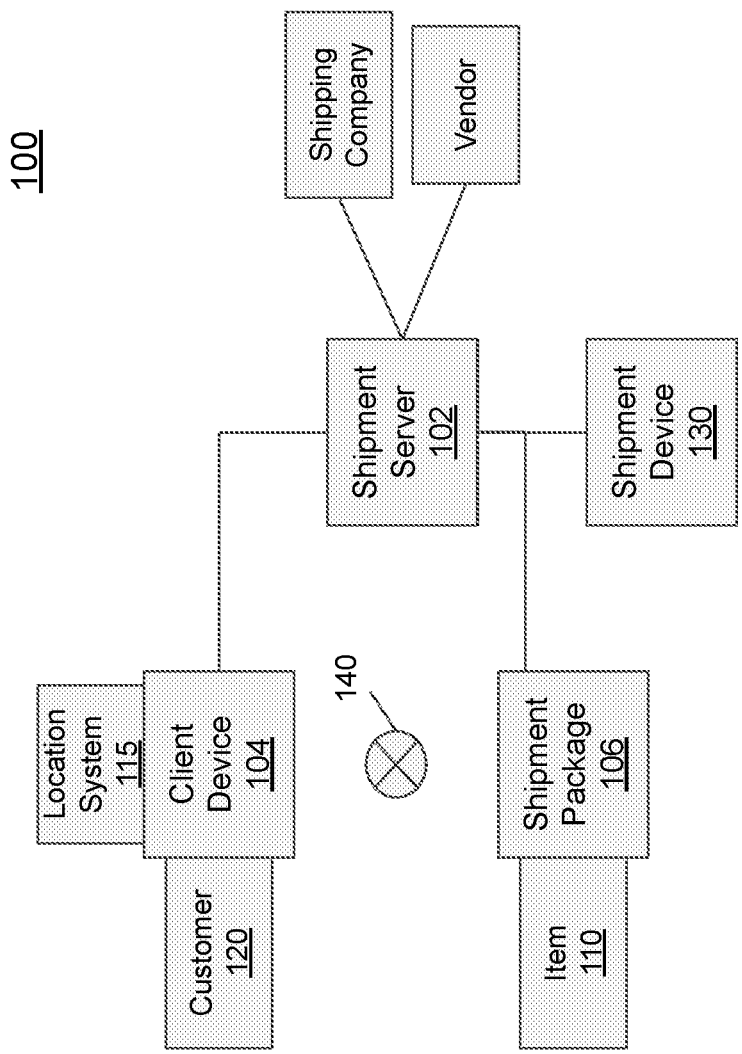
FIG. 1 depicts a block diagram of a system for ensuring receipt of shipment according to one or more embodiments of the present invention.

FIG. 1 depicts a block diagram of a system for fulfilling shipment orders according to one or more embodiments of the present invention. The system 100 includes a shipment server 102, a client device 104, and a shipment package 106. The shipment server 102 is a computer server that facilitates a vendor to receive an order for purchase of an item 110. The vendor can be a merchant such as AMAZON™, WAL-MART™, etc.

Alternatively, the vendor can be a sales platform such as EBAY™ etc. In yet other embodiments, the shipment server 102 can be a computer server of a shipping company, such as UNITED PARCEL SERVICES (UPS), UNITED STATES POSTAL SERVICES (USPS), FEDEX, etc. that receives instructions/requests/commands from the vendor.

The vendor receives the order for the item from a customer 120. The customer 120 sends the order via the client device 104. In one or more embodiments of the present invention, the order is to ship the item from a warehouse or any other location where the item presently exists to a shipment-address. The customer 120 provides the shipment-address. The shipment-address can be an address associated with the customer 120, such as his/her home, office, business, etc. Alternatively, the shipment-address can be a location that the customer 120 wants the item to be shipped to, such as a friend's or relative's home, office, business, etc.

The order can additionally include payment information, including, but not limited to price of the item, payment-card, payment-account, discount-code, gift-card, or any other details pertaining to completing or processing a payment for the sale of the item to the customer 120.

The order can additionally include shipping information, including, but not limited to shipping company, shipping method, shipping price, etc. The shipping company can be selected by the customer 120, in one or more embodiments of the present invention. The shipping method can be selected by the customer 120, and can include, but not limited to, express shipping, next day shipping, 2-day shipping, or any other such method. The shipping method can also include selection of packaging for the item, such as recyclable packaging material, no packaging material, etc.

The shipment-address, payment information, shipping information, can all be stored in one or more data repositories, and collectively be part of order information of the item 110. The order information can include additional details for processing the order for the item. The shipment server 102 has access to such order information electronically. For example, the shipment server 102 can have the order information stored locally. Alternatively, or in addition, the shipment server 102 can electronically access the order information using computer networks, either in a wired or wireless manner, from a remote server (not shown).

The shipment server 102 associates a shipment device 130 with the shipment package 106. The shipment server 102 has access to multiple shipment devices 130. In one or more embodiments, the shipment server 102 selects a shipment device 130 sequentially from the available shipment devices. Alternatively, the shipment server 102 selects the shipment device 130 from the available shipment devices 130 randomly.

Figure 2:
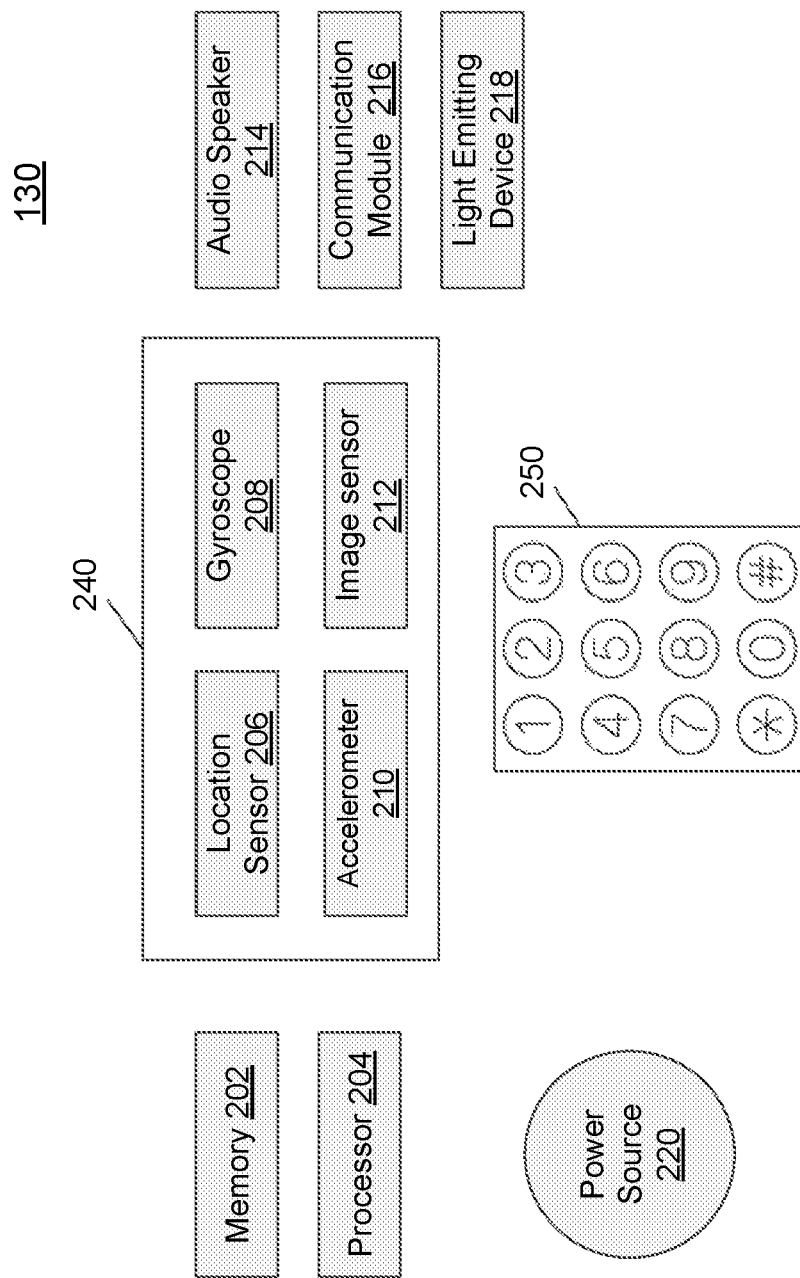
FIG. 2 depicts a block diagram of a shipment device according to one or more embodiments of the present invention.

FIG. 2 depicts a block diagram of a shipment device 130 according to one or more embodiments of the present invention. The shipment device 130 includes a memory device 202, and a processor 204. The shipment device 130 also includes a power source 220 that provides electric power to the processor 204, the memory device 202, and other components of the shipment device 130. The power source 220 can be charged using an electric connection (not shown), solar power, or any other source of power. The processor 204 can include several processing units, such as one or more processing cores, a graphics processing unit, a digital signal processing unit, an arithmetic logic unit, and other such types of processing units. The processor 204 is coupled with the memory device 202 to facilitate execution of one or more computer executable instructions. In one or more embodiments, the memory device 202 includes computer executable instructions.

The memory device 202 can include volatile memory and non-volatile memory. In one or more embodiments of the invention, data stored on the non-volatile memory may be encrypted.

In addition, the shipment device 130 includes a set of sensors 240. The set of sensors can include a location sensor 206, a gyroscope 208, an accelerometer 210, an image sensor 212 (camera) and other sensors. The shipment device 130 also includes an audio emitting device 214, such as an audio speaker. The shipment device 130 further includes a light emitting device 218, such as a light emitting diode (LED) lamp, or any other type of visual indicator. The light emitting device 218 can be caused to light up, start flashing, or perform any other pattern to indicate a visual warning. In an embodiment, the visual warning may be for a camera or another sensor of a security system (500; see FIG. 5). In one or more embodiments, the light emitting device 218 emits light using a frequency that is not visible to human eye, for example, using an infrared camera. Alternatively, or in addition, the light emitting device 218 emits a notification that can be seen by human eye. The shipment device 130 also includes a keypad 250. The keypad 250 can include one or more buttons or other user interface elements.

The shipment device 130 includes a communication module 216 that facilitates one or more modes of communication to/from the processor 204 with one or more external devices. For example, the communication module 216 can facilitate a wired communication. In addition, the communication module 216 can facilitate wireless communication. For example, the communication module 216 can communicate signals for reception by the shipment server 102 using the Internet using Wi-Fi, LTE, 3G, or any other type of communication networks. The communication module 216 can also include hardware and corresponding software that facilitate near field communication, using communication protocols such as BLUETOOTH, Z-WAVE, or any other such communication protocols. The communication module 216 facilitates communication to/from the shipment device 130.

The communication module 216 facilitates external devices, such as the shipment server 102 to send signals and data to the shipment device 130. For example, the shipment server 102 can program the shipment device 130. Such programming can include assigning a shipment-address to the shipment device 130, changing an operation mode of the shipment device 130, resetting the shipment device 130, and other such programming. Programming the shipment device 130 includes transferring data that can include one or more computer executable instructions to the shipment device 130. In addition, the data can include images, codes, parameter values (text, numbers, or other characters), and other such data that is used during execution of one or more computer executable instructions by the processor 204.

The shipment device 130 can operate in several modes. The modes can include a transport-mode, a protect-mode, a safe-mode, a program-mode, among other modes. By default, in one or more embodiments of the present invention, the shipment device 130 is in the program-mode. The shipment device 130 can be put in one of the modes by sending a signal to change the operation mode. Such a signal can be sent via the communication module 216. Alternatively, or in addition, such a signal can be input via the keypad 250.

In the program-mode, another device, such as the shipment server 102 or security base station 510 (see FIG. 5) can program the shipment device 130. For example, the shipment server 102 can assign the shipment device 130 to a particular shipment package 106 during such programming. Assigning the shipment device 130 to the shipment package 106 includes associating the shipment device 130 with the shipment-address of the shipment package 106. In the program-mode the sensors 240 may be switched off. The keypad 250 can also be switched off to save power.

In the transport-mode the shipment device 130 is can switch on a subset of the sensors 240 and switch off another subset of the sensors 240. For example, the location sensor 206 may be switched on, whereas the other sensors 240 are switched off. Further, in the transport mode the processor may be transitioned between a power-saving sleep mode for a first amount of time and another wake-up mode for a second amount of time. For example, the processor 204 is in the sleep mode for longer duration than in other modes, such as the protect-mode. For example, in the transport mode, the processor 204 may be in the sleep mode for 5 minutes and the wake-up mode for 1 minute. Such a sleep-to-wake cycle may continue until the shipment device is put in any other operation mode.

In the transport-mode, the shipment device 130 monitors, using the location sensor 206, whether the shipment device 130 is in proximity of the shipment-address. The location sensor 206 can determine a present location of the shipment device via a global positioning system, network triangulation, or any other known technique. Once the location sensor 206 determines that the shipment package 106 is in proximity of the shipment-address, the shipment device 130 can send a notification signal to the shipment server 102. The proximity of the shipment-address can be a predetermined range (e.g., 50 meters, half a mile, etc.).

In the protect-mode the shipment device 130 provides anti-theft protection to the shipment package 106 that is assigned to the shipment device 130. In the safe-mode sensors from a subset of the sensors 240 are switched off and sensors from another subset are switched off. The sensors that are switched on (or off) can be different from those in the other operating modes. In the safe-mode the gyroscope 208, the location sensor 206, and the accelerometer 210 can be switched on. The processor 204 is kept in the wake-up mode for a longer duration than in the transport mode.

In the protect-mode, the processor 204, using the sensors that are switched on, detects a movement of the shipment-device 130, and in turn the shipment package 106. If the movement of the shipment package 106 is beyond a predetermined threshold, the processor 204 causes an alarm to sound. For example, the audio speaker 214 can be used to generate an audible alarm. In addition, or alternatively, the processor 204 can send a notification to the shipment server 102 as part of the alarm. In addition, or alternatively, the processor 204 can send a notification to the customer. The processor 204 can also send a notification to the recipient, or any other person. The shipment server 102 can program where to send the message notification.

The shipment device 130 can further provide an audio/visual notification that can deter a theft of the shipment package 106. For example, the audio speaker 214 and/or the light emitting device 218 can provide the audiovisual notification. The audiovisual notification can include an alarm sound, a flashing light pattern, or any other combination.

Figure 5:
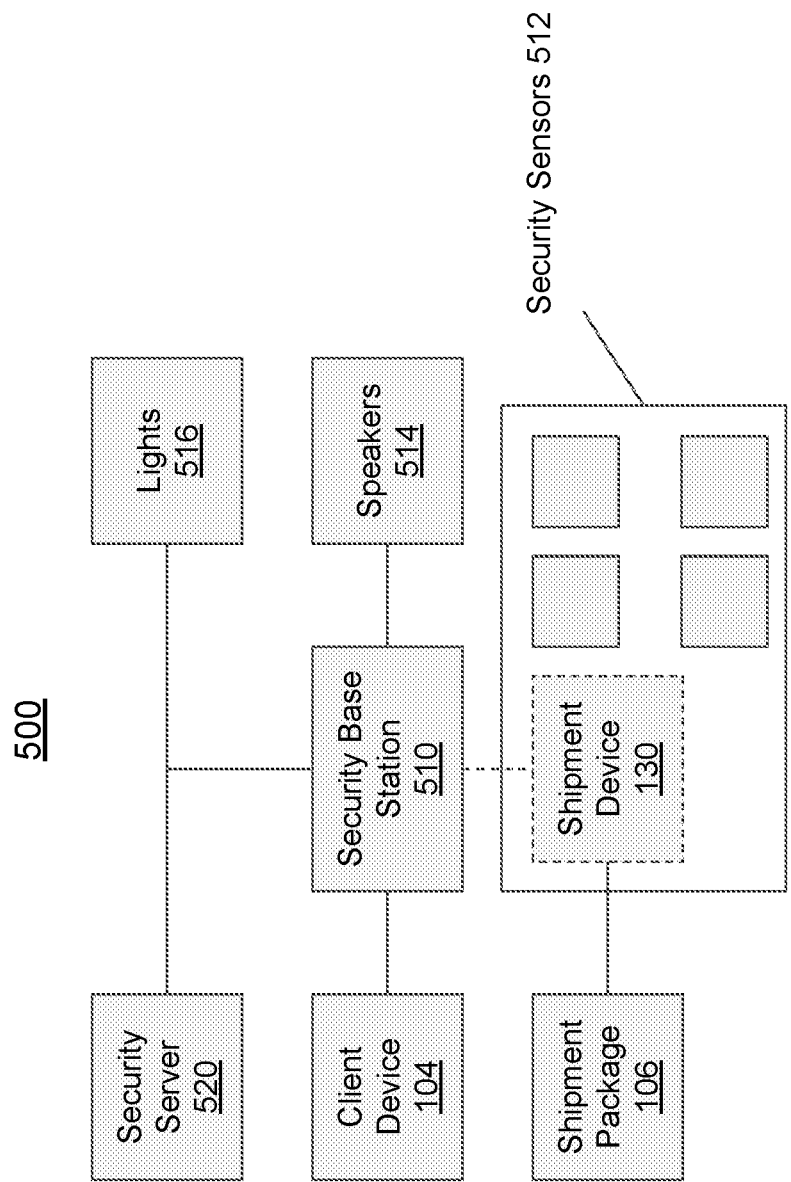
FIG. 5 depicts a block diagram of a package protection system according to one or more embodiments of the present invention.

In addition, the shipment device 130 can be monitored using a base station 510 of a security system 500 (FIG. 5). In such cases, the shipment device 130 can send a notification to the base station 510 that causes the base station 510 to sound an alarm as per one or more settings of the security system 500. In an embodiment, the notification to the base station 510 can be sent via a communication protocol such as BLUETOOTH, Z-WAVE, ZIGBEE, or any other such communication protocols that can be used for secure communication between security devices. Alternatively or in addition, the shipment device 130 can provide the notification to the base station 510 using the audio speakers 214 and/or the light emitting device 218. For example, the shipment device 130 can emit an audio or visual signal that is recognized by one or more sensors 512 of the security system 500, that in turn, cause the base station 510 to sound the alarm. In an example, the audio/light signal(s) emitted by the shipment device 130 cannot be heard or seen by human eye.

In the safe-mode the shipment device 130 is put in sleep mode, where all the sensors 240 and the processor 204 are put in sleep mode. The shipment device 130 can be transitioned out of the safe-mode via a wake-up signal, which can be provided via the communication module 216 and/or the keypad 250.

The shipment server 102 can reset the shipment device 130 prior to programming the shipment device 130. Such a reset can remove any earlier programming, particularly, that assigns the shipment device 130 to any shipment package 106. In this manner, when the shipment server 102 assigns the shipment device 130 to another shipment package 106, any information from a previous shipment package 106 does not cause any conflicts with the operation of the shipment device 130.

The shipment device 130 facilitates ensuring that the shipment package 106 is received by the correct recipient. As noted earlier, the recipient can be the customer 120 or any other person.

Figure 3:
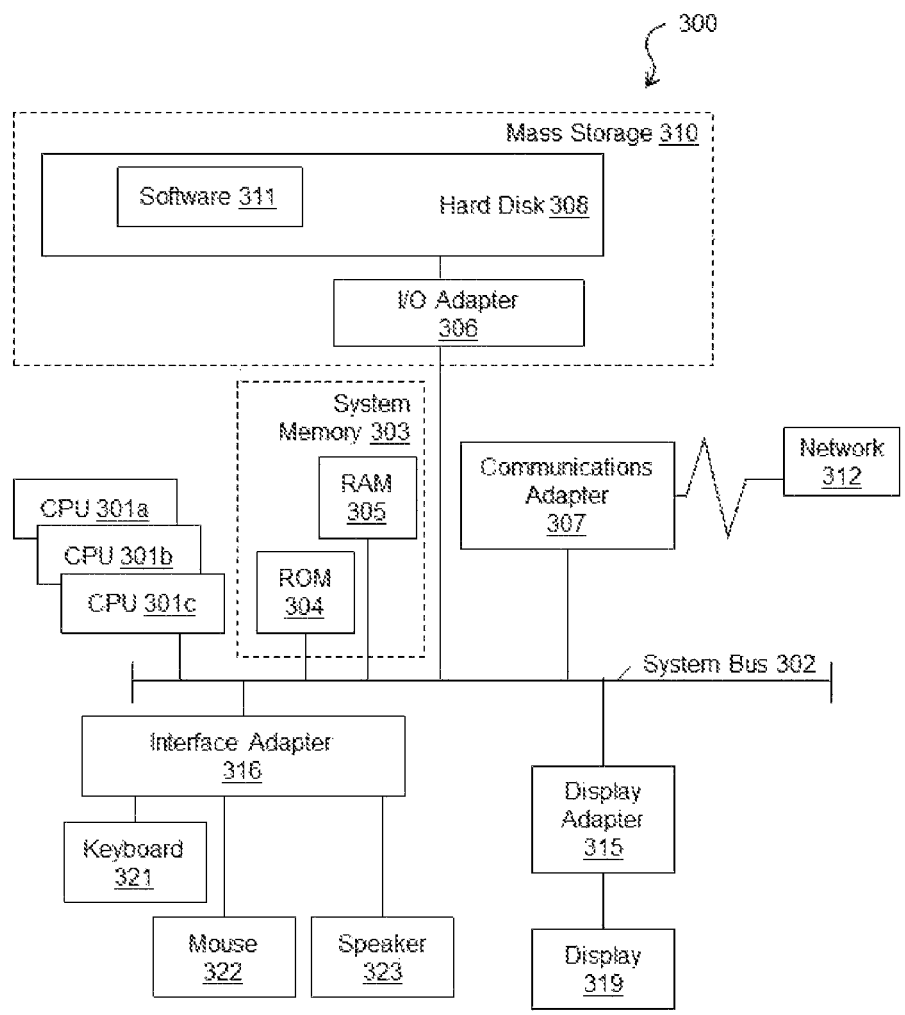
FIG. 3 depicts a computing system that can implement one or more embodiments of the present invention.

Turning now to FIG. 3, a computer system 300 is generally shown in accordance with an embodiment. The computer system 300 can be an electronic, computer framework comprising and/or employing any number and combination of computing devices and networks utilizing various communication technologies, as described herein. The computer system 300 can be easily scalable, extensible, and modular, with the ability to change to different services or reconfigure some features independently of others. The computer system 300 may be, for example, a server, desktop computer, laptop computer, tablet computer, or smartphone. In some examples, computer system 300 may be a cloud computing node. Computer system 300 may be described in the general context of computer system executable instructions, such as program modules, being executed by a computer system. Generally, program modules may include routines, programs, objects, components, logic, data structures, and so on that perform particular tasks or implement particular abstract data types. Computer system 300 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, the computer system 300 has one or more central processing units (CPU(s)) 301a, 301b, 301c, etc. (collectively or generically referred to as processor(s) 301). The processors 301 can be a single-core processor, multi-core processor, computing cluster, or any number of other configurations. The processors 301, also referred to as processing circuits, are coupled via a system bus 302 to a system memory 303 and various other components. The system memory 303 can include a read only memory (ROM) 304 and a random access memory (RAM) 305. The ROM 304 is coupled to the system bus 302 and may include a basic input/output system (BIOS), which controls certain basic functions of the computer system 300. The RAM is read-write memory coupled to the system bus 302 for use by the processors 301. The system memory 303 provides temporary memory space for operations of said instructions during operation. The system memory 303 can include random access memory (RAM), read only memory, flash memory, or any other suitable memory systems.

The computer system 300 comprises an input/output (I/O) adapter 306 and a communications adapter 307 coupled to the system bus 302. The I/O adapter 306 may be a small computer system interface (SCSI) adapter that communicates with a hard disk 308 and/or any other similar component. The I/O adapter 306 and the hard disk 308 are collectively referred to herein as a mass storage 310.

Software 311 for execution on the computer system 300 may be stored in the mass storage 310. The mass storage 310 is an example of a tangible storage medium readable by the processors 301, where the software 311 is stored as instructions for execution by the processors 301 to cause the computer system 300 to operate, such as is described herein below with respect to the various Figures. Examples of computer program products and the execution of such instruction is discussed herein in more detail. The communications adapter 307 interconnects the system bus 302 with a network 312, which may be an outside network, enabling the computer system 300 to communicate with other such systems. In one embodiment, a portion of the system memory 303 and the mass storage 310 collectively store an operating system, which may be any appropriate operating system, such as the z/OS or AIX operating system from IBM Corporation, to coordinate the functions of the various components shown in FIG. 3.

Additional input/output devices are shown as connected to the system bus 302 via a display adapter 315 and an interface adapter 316 and. In one embodiment, the adapters 306, 307, 315, and 316 may be connected to one or more I/O buses that are connected to the system bus 302 via an intermediate bus bridge (not shown). A display 319 (e.g., a screen or a display monitor) is connected to the system bus 302 by a display adapter 315, which may include a graphics controller to improve the performance of graphics intensive applications and a video controller. A keyboard 321, a mouse 322, a speaker 323, etc. can be interconnected to the system bus 302 via the interface adapter 316, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 3, the computer system 300 includes processing capability in the form of the processors 301, and, storage capability including the system memory 303 and the mass storage 310, input means such as the keyboard 321 and the mouse 322, and output capability including the speaker 323 and the display 319.

In some embodiments, the communications adapter 307 can transmit data using any suitable interface or protocol, such as the internet small computer system interface, among others. The network 312 may be a cellular network, a radio network, a wide area network (WAN), a local area network (LAN), or the Internet, among others. An external computing device may connect to the computer system 300 through the network 312. In some examples, an external computing device may be an external web server or a cloud computing node.

It is to be understood that the block diagram of FIG. 3 is not intended to indicate that the computer system 300 is to include all of the components shown in FIG. 3. Rather, the computer system 300 can include any appropriate fewer or additional components not illustrated in FIG. 3 (e.g., additional memory components, embedded controllers, modules, additional network interfaces, etc.). Further, the embodiments described herein with respect to computer system 300 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 4:
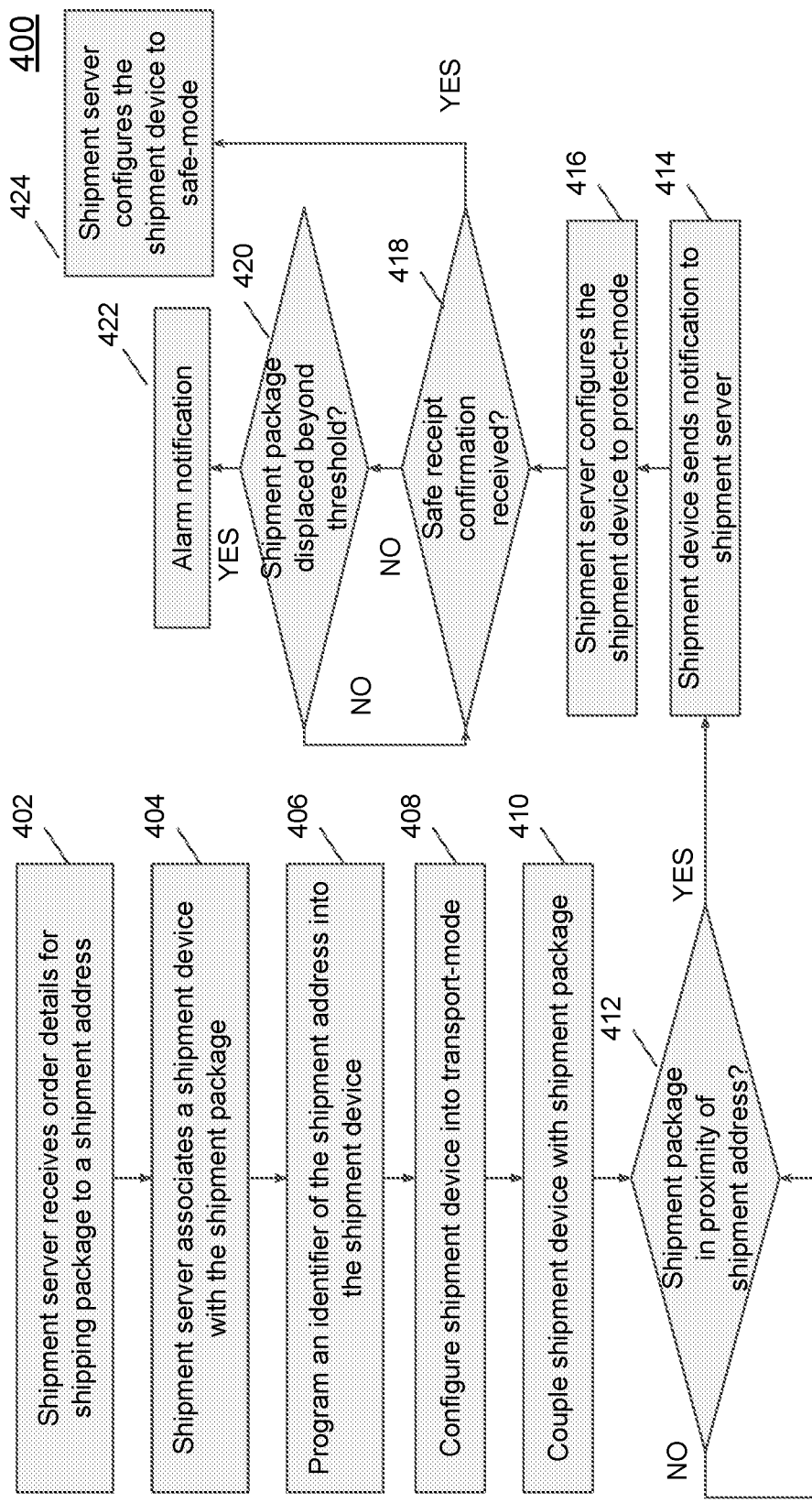
FIG. 4 depicts a flowchart of a method for ensuring receipt of a shipment using a shipment device according to one or more embodiments of the present invention.

FIG. 4 depicts a flowchart of a method for ensuring that the shipment package reaches the correct destination according to one or more embodiments. The method 400 includes receiving, by the shipment server 102, identification of the shipment package 106, at block 402. The identification of the shipment package 106 can include a machine readable code, such as a barcode, a QR code, or any other such code that is associated with the shipment package 106. The shipment server 102 further associates the shipment device 130 with the shipment package 106, at block 404. The shipment device 130 includes a shipment device, which is a collection of one or more sensors 240. For example, the shipment device can be the location sensor 206 and the gyroscope 208. In another example, the shipment device can be the location sensor 206, the gyroscope 208, and the accelerometer 210. Any other combination of the sensors 240 can be collectively referred to as the shipment device.

The method 400 further includes programming, into the shipment device, the shipment-address that is associated with the shipment package 106, at block 406. The shipment-address can be programmed by using an identifier of the shipment-address. For example, the identifier can be another machine readable code, such as a barcode, a QR code, an alphanumeric character string, or any other unique identifier that is associated with the shipment-address. The shipment-address itself can be encoded into the identifier. The identifier, in one or more embodiments, is physically located at the shipment-address. For example, a sticker with the identifier of the shipment-address is placed near a mailbox, near a door, near a porch, at a reception desk, or any other delivery location, where the shipment-package 106 is to be delivered.

The method 400 further includes configuring the shipment device 130 into the transport-mode, at block 408. The shipment device 130 is physically coupled with the shipment package 106, at block 410. The shipment device 130 continuously monitors whether the shipment package has reached within a proximity of the shipment-address, at block 412. Once the shipment package 106 reaches within the proximity, the shipment device 130 sends a notification signal to the shipment server 102, at block 414. In one or more embodiments, the shipment device 130 detects the proximity of the shipment-address in response to a machine-readable code being scanned by a scanner. The machine-readable code is a unique code associated with the shipment-address. For example, the delivery personnel, such as an employee of the shipping company, scans the machine-readable code of the shipment-address in sequence with another unique code that is associated with the shipment package 106. The shipment receiver 102 receives a notification of both these codes being scanned, which indicates that the shipment package 106 is within the proximity of the shipment-address. Here, scanning the two unique codes sequentially includes scanning the two codes within a predetermined duration of each other.

In response, the shipment server 102 configures the shipment device 130 into protect-mode, at block 416. The shipment server 102 can send a signal to the shipment device 130 to make this transition. Alternatively, the transition of the shipment device 130 into the protect-mode (or any other mode) can be performed differently. For example, a delivery person can press one or more keys on the keypad 250, scan the shipment device 130 via a sensor of the security system 500, scan the shipment package 106 via a sensor of the security system 500, etc. Alternatively, or in addition, the security base station 510 can communicate with the shipment device 130 via a camera or any other wired or wireless sensor, etc. During the case where the shipment package 106 is being picked up by the delivery person, the customer puts the shipment device 130 in the protect-mode using one or more of the above operations. For example, the identification of the shipment package 106 and the shipment device is communicated to the security base station 510 using the keypad 250, the client device 104 or any other technique.

In the protect-mode, the shipment device 130 continuously monitors whether a safe-receipt of the package has been confirmed, at block 418. The confirmation is indicated by the customer (or recipient, or another user) sending a confirmation signal to the shipment server 102 to notify that the shipment package 106 is received safely. The confirming user can login to their account, scan a code, use a link in a message, or use any other technique to send a confirmation signal about the shipment package 106 to the shipment server 102.

Until such a confirmation signal is received, the shipment device 130 monitors that the shipment package 106 is not displaced, at block 420. The displacement can be monitored using one or more of the sensors 240, such as the gyroscope 208, the accelerometer 210, etc. If the displacement is beyond a predetermined threshold, the shipment device 130 sounds an alarm, at block 422. The alarm can be switched off using an authentication, for example an authentication code, an authentication signal, etc. The authentication code can be entered via the keypad 250. Alternatively, or in addition, the authentication signal can be sent via the communication module 216. The alarm notification can include an audible alarm sounded via the speaker 216. In addition, the alarm notification includes sending one or more messages.

In another case, if the safe-receipt confirmation (418) has been received by the shipment server 102, the shipment server 102 sends a signal to configure the shipment device 130 into the safe-mode, at block 424.

FIG. 5 depicts a block diagram of a package protection system according to one or more embodiments of the present invention. The package protection system 500 can include the one or more components that have been described above. In addition, or alternatively, the package protection system 500 can further include a security base station 510, multiple security sensors 512, speakers 514, lights 516, and a security server 520. These components can be part of a security system that is used to protect a location, such as a home security system, a business security system, or any other such security system. For example, the security system can be RING®, SIMPLISAFE®, or any other such security system.

The security base station 510 propagates a security communication network, which can be a wired or a wireless network. The base station 510 communicates with the one or more security sensors 512 using the security communication network using a secure communication protocol, such as Z-WAVE, ZIGBEE etc., or any other communication protocol, such as WI-FI etc. The security sensors 512 can be position sensors, motion sensors, proximity sensors, infrared sensors, contact sensors, or any other type of security sensor. A sensor from the security sensors 512 can indicate to the base station 510 that a condition detected by that sensor has occurred. In response, the base station 510 raises a notification that the condition has occurred.

The base station 510 can communicate with the security server 520 via a communication network, which is separate from the security communication network. For example, the base station 510 can communicate with the security server 520 using the Internet, a telecommunication network, or any other network. The base station 510 raises the notification by sending a command to the security server 520. The security server 520 can, in turn, send a notification to the client device 104. Alternatively, or in addition, the base station 510 can send the notification directly to the client device 104. In addition, or alternatively, the base station 510 sends the notification to a law enforcement personnel, department, or any other device (not shown). Alternatively, or in addition, the base station 510 causes an alarm to be sounded locally via the speakers 514 and/or the lights 516. The speakers 514 can be used to make an alarm-sound that is at least at a predetermined decibel level. The lights 516 can be switched on, flashed, or in any other way to indicate that an unauthorized activity might be in progress at this location.

The package protection system 500 facilitates the shipment device 130 to be added to the security system that is propagated by the base station 510. The shipment device 130, in one or more embodiments, is included in the security system as another sensor and is added into the security communication network. For example, when the shipment device 130 is changed into protect-mode, the shipment device 130 becomes part of the security system by coupling with the base station 510. In this manner, the security system at the location of the shipment address handles protection of the shipment package 106.

The shipment device 130 can send a signal to the base station 510 upon occurrence of one or more conditions that are detected in the protect-mode. The base station 510 raises the notification(s) as described herein, in response. In this way, the protect-mode of the shipment device 130 causes the shipment package 106 to be integrated into the security system at the shipment address, and to be protected from being stolen.

The shipment device 130 can be dynamically removed from the security system, for example, using the client device 104, the keypad 250 on the shipment device, the base station 510, or in any other manner. For example, the delivery person can scan a code using the shipment device 130, scan a code using the sensors 512, provide a code via the keypad 250, or perform any other operation to move the shipment package 106 into safe-mode. In one or more embodiments, once the shipment device 130 is transitioned into safe-mode, the shipment device 130 is removed from the security system 500. In one or more embodiments, the shipment device 130 can be transitioned into transport-mode, instead of the safe-mode. The safe-mode can be transitioned into, using one or more of the operations described above, when the shipment package 106 reaches the destination.

Figure 6:
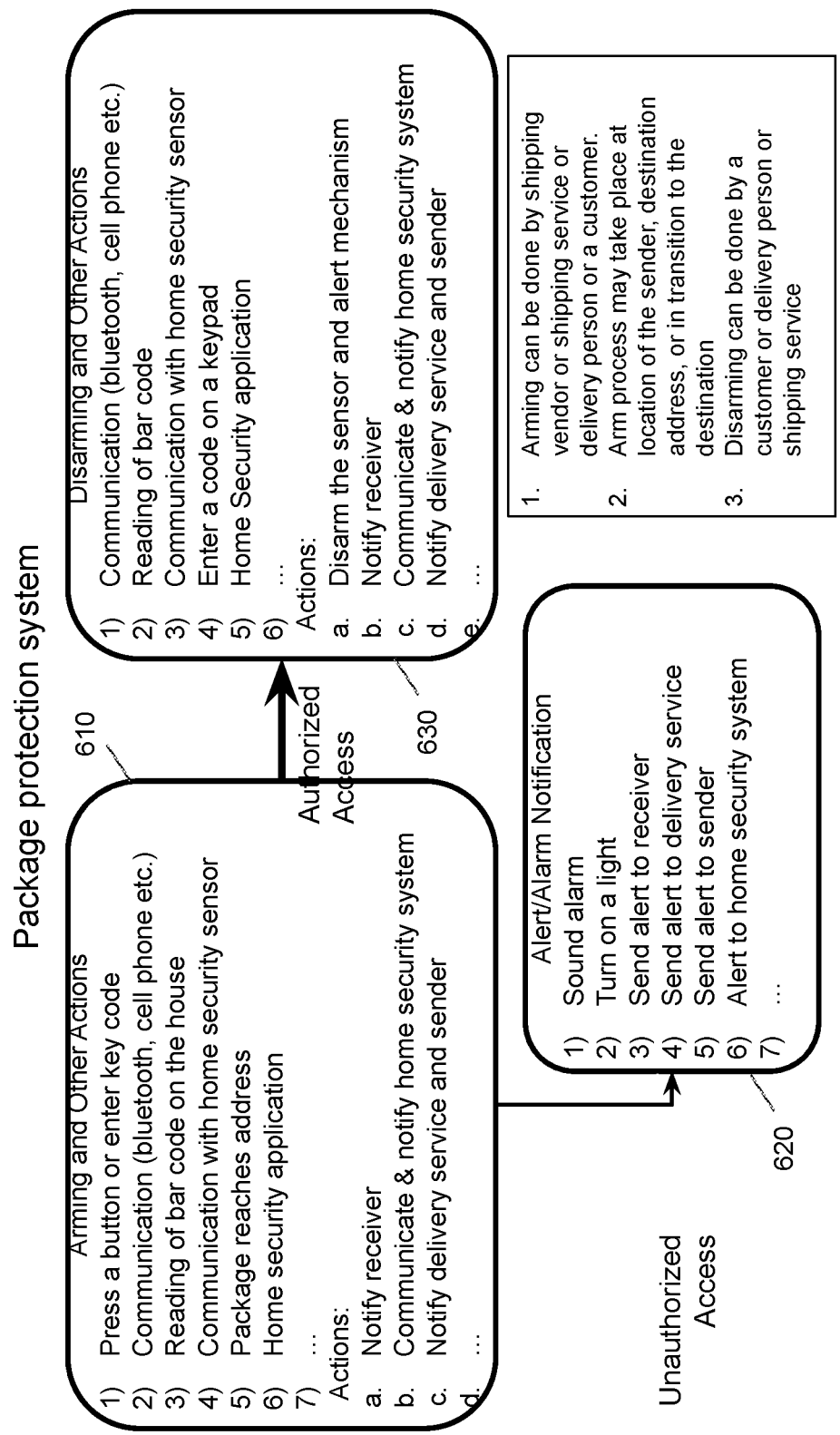
FIG. 6 depicts a process flow for a shipment to be dynamically added into a package protection system according to one or more embodiments of the invention.

FIG. 6 depicts a process flow for a shipment to be dynamically added into a package protection system according to one or more embodiments of the invention. The shipment package 106 is integrated dynamically into the security system at the security system address, at block 610. The security system address is the location of the security system 500. The security system address can be a destination address where the shipment package 106 is being received, or an address from which the shipment package 106 is to be picked up. The dynamic integration includes shipment device 130 being dynamically added, as a sensor of the security system, and coupled with the base station 510. The coupling is performed in response to the shipment device 130 being set into protect-mode, in one or more embodiments.

The shipment device 130 can be transitioned into the protect-mode using one or more operations. For example, the protect-mode can be set up in response to the press of a button or in response to the entry of a code on the shipment device 130. For example, the code can be entered via the keypad 250. Alternatively, or in addition, the protect-mode is set up using wireless communication, such as using BLUETOOTH, telecommunication etc. For example, the user that delivers the shipment package 106 can trigger the protect-mode using a portable device that s/he carries. The user can be a delivery person that is dropping the shipment package 106 at the security system address. Alternatively, the user can be a resident/owner of the security system address that has requested that the shipment package 106 be picked up by a delivery person. Alternatively, or in addition, the protect-mode can be set up in response to reading of the identification mark at the destination. In yet another example, the protect-mode can be enabled when the shipment device 130 communicates with one or more of the security sensors 512. For example, a camera (e.g., doorbell camera, or any other type of camera) can be used to scan an identification of the shipment package 106, and trigger the shipment device 130 to be added into the security system. The protect-mode can also be set up when the shipment device 130 detects that the shipment package has reached the destination address.

In one or more embodiments, upon dynamically integrating the shipment device 130 in the security system, the recipient can be notified on the client device 104. Alternatively, the security system provides a notification that the shipment device 130 has been added. In addition, or alternatively, the delivery service provider and/or the sender of the shipment package 106 is notified that the shipment package 106 has reached the destination, and that the shipment device 130 is now added into the security system in the protect-mode.

Further, if the shipment package 106 is displaced in the protect-mode, beyond a predetermined threshold, an alarm is raised, at block 620. Raising the alarm can include sounding an alarm (audio/visual) at the shipment device 130, sending an alert to the client device 104, sending an alert to the delivery service provider, sending an alert to the sender, sending an alert to the base station 510, that causes a notification as per one or more settings of the security system. The alarm is raised in case of unauthorized displacement in the protect-mode.

In the case of authorized access, such alarm(s) is/are not raised, at block 630. The authorized access can be performed by a user including a delivery person that is picking up the shipment package 106 at the security system address. Alternatively, the authorized user can be a resident/owner of the security system address that is receiving the shipment package 106. The authorized access can be determined via an initial notification to the shipment device 130, to transition it into the safe-mode. The safe-mode or the transport-mode can be enabled using one or more techniques, including, but not limited to communication (BLUETOOTH, phone, etc.), reading a barcode on the shipment package 106 (or shipment device 130), communication with the base station 510, entry of a code on the keypad 250, reading of a barcode at the shipment address, biometric recognition (e.g., voice, face, fingerprint etc.) of the authorized user, etc. The protect-mode of the shipment device 130 is disarmed, and the safe-mode or the transport-mode is enabled. In one or more embodiments, upon disarming the protect-mode, the shipment device 130 is removed as a sensor from the security system, disabling any alerts from the shipment device reaching the base station 510. Further, the customer 120 is notified. Further, the base station 510 is notified to remove the shipment device 130 from the security system. Further, in one or more embodiments, the delivery service provider and/or the sender is/are notified of the transition of the shipment device 130 into the safe-mode or the transport-mode. Typically, this can be deemed as the shipment package 106 being received accurately by the intended recipient.

Figure 7:
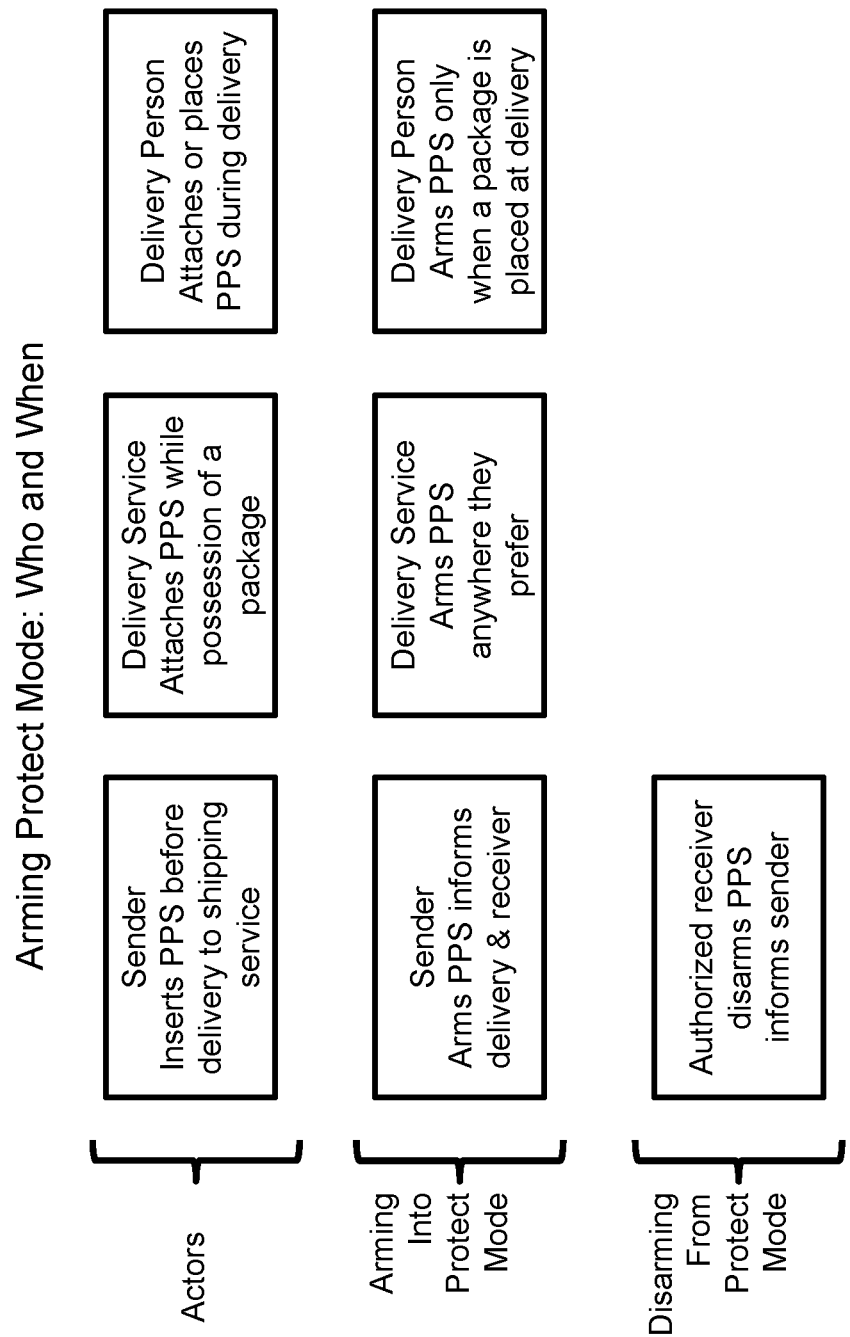
FIG. 7 depicts actors who are involved with and the timing of setting up a package protection system according to one or more embodiments.

FIG. 7 depicts actors who are involved with and the timing of setting up a package protection system according to one or more embodiments. In one or more embodiments, the sender attaches the shipment device 130 to the shipment package 106 before it is handed to the delivery service provider. The sender can be a vendor, a retailer, a shipping company, a customer, or any other user of that is sending the shipment package 106. Alternatively, the delivery service provider attaches the shipment device 130 to the shipment package 106 upon receiving it for delivery. Alternatively, the delivery service provider attaches the shipment device 130 to the shipment package 106 upon delivering the shipment package 106 at the destination address.

With respect to the timing of setting up the protect-mode on the shipment device 130, the sender can set up the protect-mode. Further, the sender can inform the delivery service provider and/or the recipient of the transition. Alternatively, in other embodiments, the delivery service provider can set up the protect-mode at any time after receiving the shipment package 106, but prior to delivering the shipment package 106. In other embodiments, the delivery service provider changes the mode of the shipment device 130 to the protect-mode upon delivering the shipment package 106 to the destination address.

The shipment device 130 can be disarmed, i.e., transitioned out of the protect-mode by an authorized user only. The authorized user can be the customer 120 that is scheduled to receive the shipment package 106. Alternatively, or in addition, the customer 120 can be the one scheduling a pickup of the shipment package 106. Alternatively, or in addition, the authorized user can include a delivery person scheduled to pick up the shipment package 106. The shipment device 130 can be disarmed from the protect-mode, and transitioned into the safe-mode, or in the transport-mode. For example, if the shipment package 106 is being received by the customer 120, s/he transitions the shipment device 130 into safe-mode. Instead, if the shipment package 106 is being picked up, the delivery person transitions the shipment device 130 into transport-mode.

Figure 8:
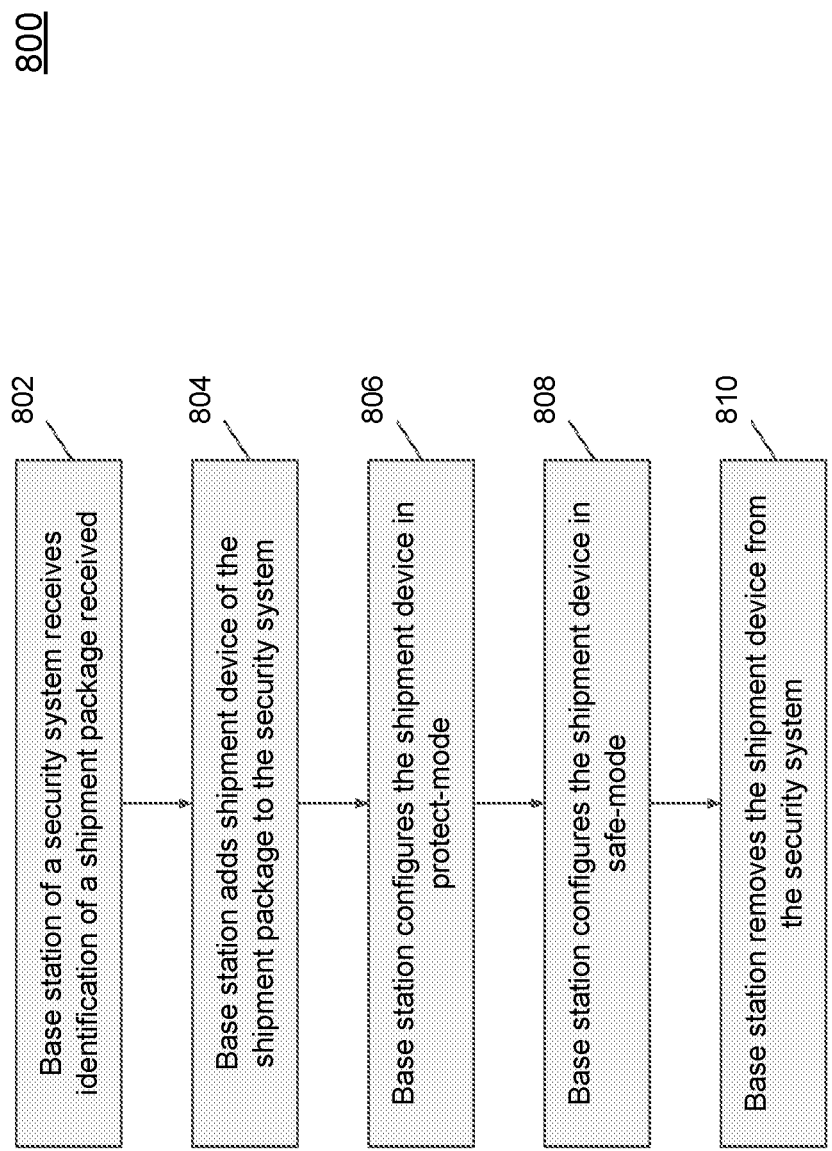
FIG. 8 depicts a flowchart for adding and removing a shipment package into a security system in an ad hoc manner according to one or more embodiments.

FIG. 8 depicts a flowchart for adding and removing a shipment package into a security system in an ad hoc manner according to one or more embodiments. The method 800 includes receiving, by the base station 510 of the security system, an identification of the shipment package 106, at block 802. The identification can be received from a first security sensor 512 that is part of the security system 500. The first security sensor 512, in an example, is a camera that is part of the security system 500. For example, the camera can be part of, or associated with a doorbell. Alternatively, or in addition, the first sensor 512 can be any other camera. Further, the first sensor 512 can be any other type of sensor that can scan/read the identification of the shipment package 106 and send the identification to the base station 510. For example, the identification of the shipment package 106 is received by scanning a code of the shipment package via the camera. The code can be a barcode, a QR code, or any other such code. Alternatively, the identification of the shipment package 106 is received by scanning a radio frequency identification (RFID) associated with the shipment package 106. The identification can be read and sent to the base station 510 in any other manner than described herein in other examples.

Further, at block 804, the base station 510 adds the shipment device 130 of the shipment package 106 as a second security sensor 512 of the security system 500. In one or more examples, the base station 510 communicates with the shipment device 130 and accesses one or more attributes of the shipment device 130 to add the shipment device 130 as a sensor in the security system 500. For example, the base station 510 accesses one or more unique identifiers that are associated with the shipment device 130, such as a serial number, a MAC address, or any other identifier. In an example, the identifier can be a predetermined value that is stored by the shipment device 130. The identifier can also be a combination of one or more attributes of the shipment device 130, such as serial numbers of one or more components of the shipment device 130, shipment package identification, date, time, shipment address, etc.

In an example, prior to adding the shipment device 130 to the security system 500, the base station 510 confirms that the shipment package 106 is at the right address. For example, in response to receiving the identification of the shipment package 106, the base station 510 verifies that the identification is associated with a shipment address that is the address at which the base station 510 is located. The base station 510, in this case, communicates with the shipment server 102 or any other device to determine the shipment address associated with the shipment package 106 based on the identification.

Alternatively, the base station 510 verifies that the shipment package 106 is at the correct address by verifying that the identification of the shipment package 106 is associated with at least one predetermined identification from a list of expected shipment packages. In this case, the base station 510 receives, at a time earlier than the shipment package 106 being received, the list of shipment packages expected at the shipment address (i.e., address at which the base station 510 is located). For example, the shipment server 102 can transmit the list of expected shipment packages to the base station 510. In one or more examples, the shipment server 102 transmits, and the base station 510 receives, such a list of expected shipment packages at a predetermined frequency, for example, daily at 5 AM, or twice daily at 5 AM and 2 PM, or any other frequency and timing. The frequency and the times at which the expected shipment packages are received by the base station 510 can be configured by a user. In another example, the base station 510 receives the list of expected shipment packages from the client device 104. The list of expected shipment packages can include a list of the corresponding identifications of the expected shipment packages.

The base station 510, in response to receiving the identification from the first sensor 512, verifies that the identification matches one of the identifications from the received list. If a match is detected, the shipment device 130 of the shipment package 106 is added to the security system 500. If not, the shipment device 130 may not be added to the security system 500, and instead, a notification may be sent to the customer 120, for example, via the client device 104. A notification may also be sent to the shipment server 102, the shipping company, and/or the vendor. The notification identifies that the shipment package was received at the address of the base station 510 in error.

Adding the shipment device 130 as part of the security system 500 includes monitoring the shipment device 130 for change in one or more attributes and sounding an alarm if one or more predetermined conditions are detected with respect to the sensor data received from the shipment device 130.

At block 806, the base station 510 configures the shipment device 130 in protect-mode. Transitioning the shipment device 130 into the protect-mode includes generating a notification indicative that the transition was successful (or not). The notification can be provided through one or more of the sensors 512, for example, the camera. Alternatively, the notification can be provided by the shipment device 130. The notification can include an audible beep, or a visual indication. As described herein, the shipment device 130 sounds an alarm in response to the shipment being displaced by at least a predetermined distance when in the protect-mode. In one or more examples, the base station 510 determines whether the shipment device 130 is already in protect-mode, in which case, the base station 510 does not change the mode of the shipment device 130. For example, in the protect-mode, the base station 510 monitors and ensures that the shipment package 106 is not moved more than a predetermined threshold. If the shipment package 106 is moved beyond the predetermined threshold, the alarm is sounded.

Sounding the alarm can include the base station 510 communicating with the security server 520, and/or the client device 104. In addition, or alternatively, causing the alarm to sound can include causing an audio/visual effects, such as, sounding an alarm-sound at above a threshold decibel level using the security speakers 514. The visual effects can include causing one or more lights 516 of the security system 500 to turn on, flash, or cause any other pattern. Sounding the alarm can additionally include causing the shipment device 130 to provide audio/visual alarm effects using one or more components of the shipment device 130.

The movement of the shipment package 106 can include using the gyroscope 208, the accelerometer 210, the location sensor 206, or any other components of the shipment device 130.

At block 808, the base station 510 reconfigures the shipment device 130 in safe-mode. In an example, the reconfiguration is performed in response to receiving via the client device 104 a confirmation signal that the shipment package 106 has been safely received.

In the safe-mode, as described herein, the alarm is turned off, and monitoring of the shipment package 106 is stopped.

At block 810, the base station 510 removes the shipment device 130 from the set of sensors 512 of the security system 500 once the safe-mode is triggered. Removing the shipment device 130 as one of the sensors 512 includes deleting any of the information, such as the attributes of the shipment device 130 that was accessed and stored during the addition of the shipment device 130 as one of the sensors 512.

Figure 9:
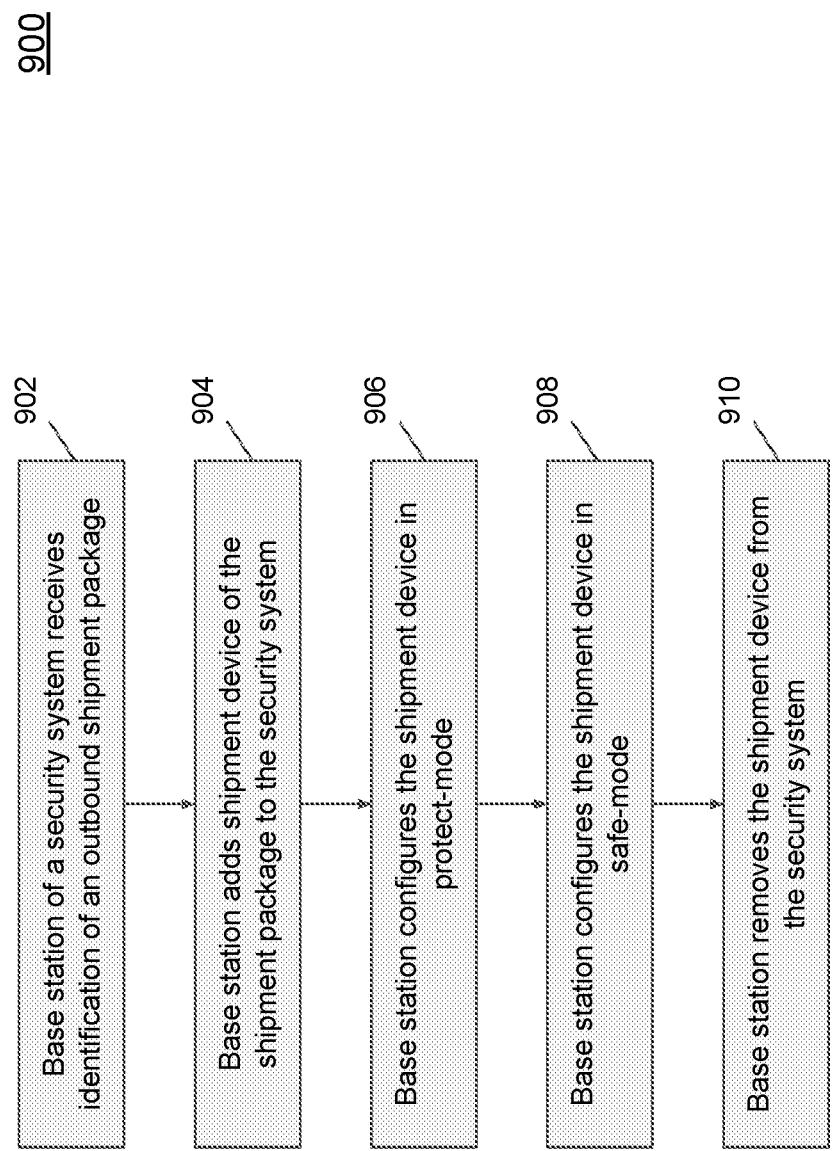
FIG. 9 depicts a flowchart for adding and removing a shipment package into a security system in an ad hoc manner according to one or more embodiments.

FIG. 9 depicts a flowchart for adding and removing a shipment package into a security system in an ad hoc manner according to one or more embodiments. The method 800 (FIG. 8) depicts a scenario where an incoming shipment package 106 requires to be protected by the security system 500 until the shipment package 106 is received by the customer 120. The method 900 in FIG. 9 depicts a scenario where an outgoing shipment package 106 is protected by the security system 500 until the shipment package 106 is picked up, for example, by a designated delivery service-person.

The method 900 includes, at block 902, receiving, by the base station 510, the identification of the shipment package 106. The identification can be provided via the first sensor 512 as described herein. Alternatively, the identification can be provided via the client device 104. In an example, the client device 104 indicates to the base station 510 to add the shipment package 106 to a list of outbound or outgoing packages that are to be protected. Alternatively, the customer 120 can use any other technique to cause the base station 510 to identify the shipment package 106 as an outgoing package. For example, the customer 120 can interact with the base station 510 via one or more panels (not shown) that are part of the base station 510 itself, or part of the security system 500 and which communicate with the base station 510. In another example, the base station 510 automatically adds a shipment package 106 in a list of packages to be protected in response to receiving the identification of the shipment package 106.

At block 904, the shipment device 130 of the shipment package 106 is added as one of the sensors 512 of the security system 500 by the base station 510. Adding the shipment device 130 as one of the sensors 512 includes the operations described herein, and are not repeated.

At block 906, the base station 510 configures the shipment device 130 in protect-mode. The base station 510 monitors the shipment package 106 in this mode and ensures that it is not displaced in an unauthorized manner. If the shipment package 106 moves beyond the predetermined threshold, the alarm is sounded, as described herein. The movement is monitored using one or more of the components of the shipment device 130.

At block 908, the base station 510 reconfigures the shipment device 130 in safe-mode. In the safe-mode, as described herein, the alarm is turned off, and monitoring of the shipment package 106 is stopped. In an example, the reconfiguration is performed in response to receiving via an authorized device a confirmation signal that the shipment package 106 has been safely received for shipment. The authorized device can be the shipment server 102. In an example, a user that picks up the shipment package 106 uses a portable device (not shown), such as a personal digital assistant, a point of sale device, a phone, or any other portable device to scan the identification of the shipment package 106. The portable device sends a notification to the shipment server 102 that shipment package 106 has been picked up, the notification including the identification. In response, the shipment server 102 sends another notification to the base station 510 indicating that the shipment package 106 has been picked up by an authorized person.

In another case, the safe-mode is triggered in response to at least two identifications received by the base station 510. A first identification includes the identification of the shipment package 106. A second identification includes an identification of the user designated to pick up the shipment package 106. Upon receiving at least two identifications in quick succession the base station 510 authenticates the user via the shipment server 102. Here, "quick succession" is a predetermined duration between the two scans of the identifications, for example, 5 seconds, 10 seconds, etc. If the two identifications are scanned in succession and the duration between the two scans is less than (or equal to) the predetermined duration, the base station 510 checks if either of the two identifications represents an authorized user. Alternatively, in an embodiment, the first code to be scanned has to be that of the user identification, and only if the user is authenticated, can the user move and scan the shipment package 106 using the sensor 512. Here, the base station 510 transitions the shipment device 130 from the protect-mode to the safe-mode upon the user authentication. If the shipment package 106 is not scanned within the predetermined duration, the base station 510 transitions the shipment device 130 back to the protect-mode. If the user is not authenticated, and if s/he moves the shipment package 106 for subsequent scan, the base station 510 can initiate the alarm in the protect-mode, as described herein.

Checking the identification of or authenticating the user includes sending the user's identification to the shipment server 102 to authenticate the user. The shipment server 102 determines whether the identification includes, for example, an employee identifier, name, or any other unique identifier associated with the authorized user that is designated to pick up the shipment package 106. If the shipment server 102 indicates to the base station 510 that the user is authorized, the base station 510 puts the shipment device 130 to safe-mode. If the shipment server 102 indicates that the identification does not belong to any authorized user, the base station 510 does not change the shipment device 130 into the safe-mode, i.e., the shipment device 130 stays in the protect-mode. Accordingly, the alarm can sound in case the shipment device 130 is moved beyond the predetermined threshold.

At block 910, the base station 510 removes the shipment device 130 from the set of sensors 512 of the security system 500 once the safe-mode is triggered. Removing the shipment device 130 as one of the sensors 512 includes deleting any of the information, such as the attributes of the shipment device 130 that was accessed and stored during the addition of the shipment device 130 as one of the sensors 512. In one or more embodiments, the base station 510 also sends a notification to the client device 104 that the shipment package 106 has been picked up. In one or more embodiments, the identification of the authorized user is included in the notification. Notifications can also be sent to the shipment server, recipient of the shipment package 106, or other entities in one or more embodiments.

In one or more embodiments, additional information of the user that picked up the shipment package 106 is also included in the notification. The additional information can include an image, and/or a video of the user. Additionally, or alternatively, the shipment device 130 also captures information of the user picking up the shipment device 130 using RFID, NFC, or other such techniques based on an employee badge or other form of identification that the user is carrying. The notification sent to the client device 104 can be an email, a text message, a web-message, or any other type of notification. In one or more embodiments, the base station 510 captures such additional information about the user via other sensors 512 of the security system 500 in combination with the shipment device 130. A notification can also be sent to the shipment server 102, in addition, or alternatively.

Embodiments of the technical solutions described herein provide a practical application to prevent theft of shipment packages that are left in the porch, yard, or other areas outside a house, office, or other buildings. The technical solutions described herein facilitate improving a security system that is typically used in homes, offices, etc. The improvement includes adding and removing a shipment device as an ad hoc sensor of the security system. The shipment device is coupled with a shipment package. The shipment device, when added to the security system, communicates with a base station of the security system. The base station monitors one or more measurements from sensors that are included in the shipment device. For example, the shipment device can indicate whether the shipment package has been displaced a certain amount, in which case, the base station can trigger an alarm. Once the base station is notified that the shipment package has received a specified destination, for example, has been received/picked up by an authorized user, the base station stops monitoring the shipment device, and removes the shipment device as a sensor of the security system.

It should be noted that during all of the operations described herein, the base station can facilitate a predetermined duration to pass before a transitioning the shipment device from one state to another. For example, when transitioning the shipment device from one mode (e.g., safe-mode) to another (e.g., protect-mode), sounding an alarm, or any other such state transition, the base station waits for at least the predetermined duration before the state is updated. The base station may provide an indication of the transition, for example, via an audible or visual notification. The notification can be provided via the speakers 514, the lights 516, and/or the shipment device 130.

Figure 10:
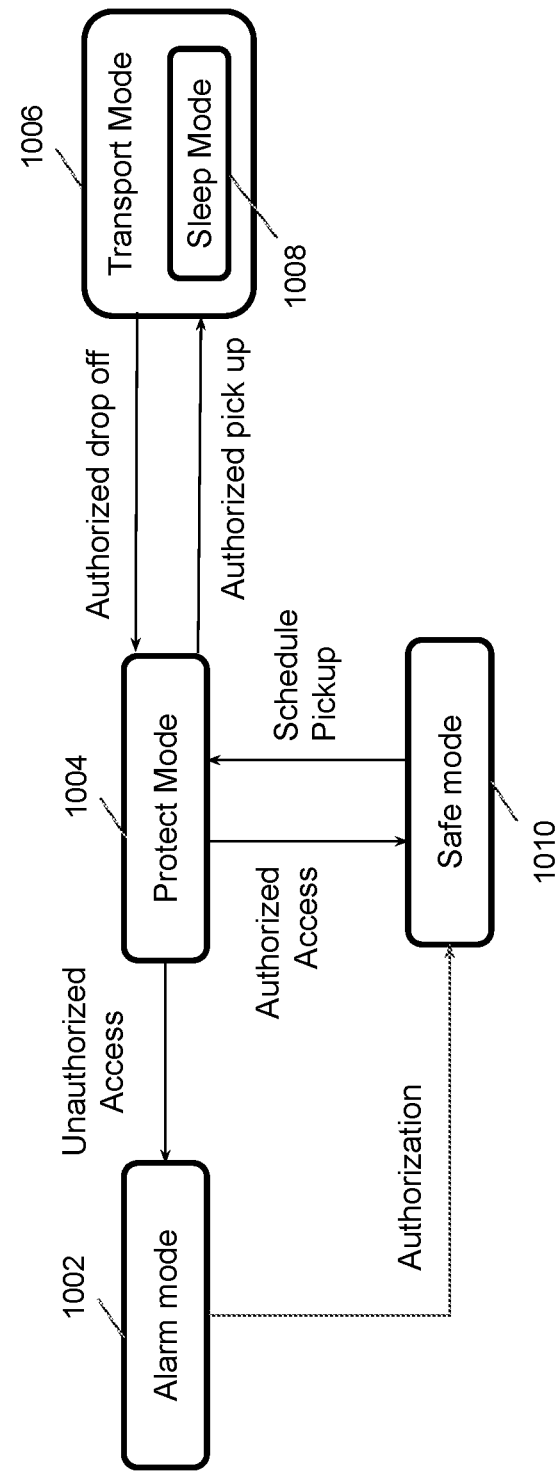
FIG. 10 depicts a state transition diagram for the various states in which the shipment device can be programmed according to one or more embodiments.

FIG. 10 depicts a state transition diagram for the various states in which the shipment device can be programmed according to one or more embodiments. In the case of the shipment package 106 being delivered to the security system address, the shipment device 130 can be placed in transport-mode (1006) when the shipment device 130 is associated with the shipment package 106. The transport-mode can facilitate the shipment device 130 to determine whether the shipment package 106 has reached a specified destination, for example, security system address.

Upon reaching the specified destination, the shipment device 130 can be transitioned into the protect-mode (1004). Such a transition can be automatic. Alternatively, the transition is performed by one of the users including, the sender, the delivery person, the customer 120. As described herein, the shipment device 130 can be transitioned into the protect-mode once the shipment package 106 has reached the security system address, which has been associated as a destination address of the shipment package 106. The customer 120 can transition the shipment device 130, from the protect-mode, into the safe-mode (1010) to indicate the shipment package 106 has been correctly delivered and received. Alternatively, if the shipment package 106 is accessed in an unauthorized manner, i.e., displaced beyond a threshold, without providing authorization, the shipment device 130 enters into the alarm-mode (1002). The alarm is sounded in the alarm-mode (1002), including a local audio-visual notification, remote audiovisual notification, requesting security personnel (e.g., police) to intervene, etc. The shipment device 130 can be transitioned from the alarm-mode (1002) to the safe-mode (1010) by providing authorization, for example, security code, scanning identification, or in any other manner.

In the case where the shipment package 106 is scheduled for pickup, the customer 120 sets the shipment device 130 into the protect-mode (1004). The delivery person can transition the shipment device 130 into the safe-mode (1010) or the transport-mode (1006) upon picking up the shipment package 106. The transport-mode (1006) can include the sleep-mode (1008) in which, some of the components of the shipment device 130 are placed in a power-saving mode as described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a base station of a security system, an identification of a shipment package, the identification received from a first security sensor that is part of the security system;
   adding, by the base station, a shipment device of the shipment package as a second security sensor of the security system;
   configuring, by the base station, the shipment device in protect-mode, wherein the shipment device sounds an alarm in response to the shipment being displaced by at least a predetermined distance when in the protect-mode; and
   reconfiguring, by the base station, the shipment device in safe-mode in response to receiving, from a customer associated with the shipment package, a confirmation signal that the shipment package has been safely received.

2. The computer-implemented method of claim 1, wherein, in the protect-mode, in response to the shipment package being displaced by at least a predetermined distance, causing an alarm via the base station.

3. The computer-implemented method of claim 1, wherein the first security sensor comprises a camera, and the identification of the shipment package is received by scanning a code of the shipment package via the camera.

4. The computer-implemented method of claim 1, wherein the identification of the shipment package is received by entering a code of the shipment package via the first security sensor.

5. The computer-implemented method of claim 1, further comprising, in response to receiving the identification of the shipment package, verifying, by the base station, that the identification is associated with an address at which the base station is located.

6. The computer-implemented method of claim 1, further comprising, in response to receiving the identification of the shipment package, verifying, by the base station, that the identification is associated with at least one predetermined identification from a list of expected shipment packages.

7. The computer-implemented method of claim 6, further comprising, receiving, by the base station, information about an expected shipment package from a shipment server.

8. The computer-implemented method of claim 6, further comprising, receiving, by the base station, information about an expected shipment package from a client device.

9. A computer-implemented method comprising:
   receiving, by a base station of a security system, from a first security sensor that is part of the security system, an identification of a shipment package;
   adding, by the base station, a shipment device of the shipment package as a security sensor of the security system;
   configuring, by the base station, the shipment device in protect-mode, wherein the shipment device sounds an alarm in response to the shipment being displaced by at least a predetermined distance when in the protect-mode;
   reconfiguring, by the base station, the shipment device in safe-mode in response to authenticating a user associated with a pickup of the shipment package; and
   removing, by the base station, the shipment device from the security system.

10. The computer-implemented method of claim 9, wherein, in the protect-mode, in response to the shipment package being displaced by at least a predetermined distance, causing an alarm via the base station.

11. The computer-implemented method of claim 9, wherein the first security sensor comprises a camera, and the identification of the shipment package is received by scanning a code of the shipment package via the camera.

12. The computer-implemented method of claim 9, wherein the identification of the shipment package is received by entering a code of the shipment package via the first security sensor.

13. The computer-implemented method of claim 9, wherein the identification of the shipment package is received from a client device.

14. The computer-implemented method of claim 9, wherein authenticating the user comprises receiving, from an authorized device associated with the pickup of the shipment package, a confirmation signal that the shipment package has been safely picked up.

15. The computer-implemented method of claim 9, wherein authenticating the user comprises, receiving, by the base station, information about the authorized user from a shipment server.

16. A security system comprising:
a plurality of security sensors; and
a base station coupled with the security sensors, the base station comprising:
  a memory device; and
  one or more processors coupled with the memory device, the one or more processors configured to perform a method comprising:
    receiving an identification of a shipment package, the identification received from a first security sensor from the plurality of sensors;
    adding, by the base station, a shipment device of the shipment package as a second security sensor of the security system;
    configuring the shipment device in protect-mode, wherein the shipment device sounds an alarm in response to the shipment being displaced by at least a predetermined distance when in the protect-mode; and
    reconfiguring the shipment device in safe-mode in response to receiving, from a customer associated with the shipment package, a confirmation signal that the shipment package has been safely received.

17. The security system of claim 16, wherein the first security sensor comprises a camera, and the identification of the shipment package is received by scanning a code of the shipment package via the camera.

18. The security system of claim 16, wherein the identification of the shipment package is received from a client device.

19. The security system of claim 16, wherein authenticating the user comprises receiving, from an authorized device associated with the pickup of the shipment package, a confirmation signal that the shipment package has been safely picked up.

20. The security system of claim 16, wherein authenticating the user comprises, receiving, by the base station, information about the authorized user from a shipment server.

* * * * *